United States Patent
Akiyama et al.

(10) Patent No.: US 12,493,046 B2
(45) Date of Patent: Dec. 9, 2025

(54) ALLERGEN DETECTION MARKER AND ALLERGEN DETECTION METHOD USING SAME

(71) Applicants: JAPAN AS REPRESENTED BY DIRECTOR GENERAL OF NATIONAL INSTITUTE OF HEALTH SCIENCES, Kawasaki (JP); NISSHIN SEIFUN GROUP INC., Chiyoda-ku (JP)

(72) Inventors: Hiroshi Akiyama, Setagaya-ku (JP); Hiroyuki Kikuchi, Kawasaki (JP); Yusuke Seki, Fujimino (JP); Chisato Arimoto, Fujimino (JP)

(73) Assignees: JAPAN AS REPRESENTED BY DIRECTOR GENERAL OF NATIONAL INSTITUTE OF HEALTH SCIENCES, Kawasaki (JP); NISSHIN SEIFUN GROUP INC., Chiyoda-ku (JP)

( * ) Notice: Subject to any disclaimer, the term of this patent is extended or adjusted under 35 U.S.C. 154(b) by 734 days.

(21) Appl. No.: 17/639,226

(22) PCT Filed: Jul. 9, 2020

(86) PCT No.: PCT/JP2020/026896
§ 371 (c)(1),
(2) Date: Feb. 28, 2022

(87) PCT Pub. No.: WO2021/039147
PCT Pub. Date: Mar. 4, 2021

(65) Prior Publication Data
US 2022/0299523 A1  Sep. 22, 2022

(30) Foreign Application Priority Data
Aug. 30, 2019 (JP) ................................ 2019-158119

(51) Int. Cl.
| | | |
|---|---|---|
| G01N 33/68 | (2006.01) |
| C12Q 1/37 | (2006.01) |
| G01N 30/02 | (2006.01) |
| G01N 30/06 | (2006.01) |
| G01N 30/72 | (2006.01) |
| G01N 33/10 | (2006.01) |

(52) U.S. Cl.
CPC .......... G01N 33/6848 (2013.01); C12Q 1/37 (2013.01); G01N 30/06 (2013.01); G01N 30/7233 (2013.01); G01N 33/10 (2013.01); G01N 2030/027 (2013.01)

(58) Field of Classification Search
CPC .............. G01N 33/6848; G01N 30/06; G01N 30/7233; G01N 33/10; G01N 2030/027; G01N 2030/8831; G01N 27/62; G01N 30/72; G01N 33/02; C12Q 1/37; C07K 14/415
See application file for complete search history.

(56) References Cited

U.S. PATENT DOCUMENTS

2013/0280742 A1  10/2013  Young et al.
2019/0302081 A1  10/2019  Seki

FOREIGN PATENT DOCUMENTS

| JP | 2006-126083 A | 5/2006 |
| JP | 2013-539039 A | 10/2013 |
| JP | 2014-525588 A | 9/2014 |
| WO | WO 03/066079 A2 | 8/2003 |
| WO | WO 2018/016551 A1 | 1/2018 |

OTHER PUBLICATIONS

International Search Report mailed on Aug. 18, 2020 in PCT/JP2020/026896 filed on Jul. 9, 2020 (3 pages).
Jira, W. et al., "A sensitive HPLC-MS/MS screening method for the simultaneous detection of barley, maize, oats, rice, rye and wheat proteins in meat products", Food Chemistry, 2019, vol. 275, pp. 214-223, XP085515079.
Martinez-Esteso, M. J. et al., "Defining the wheat gluten peptide fingerprint via a discovery and targeted proteomics approach", Journal of Proteomics, 2016, vol. 147, pp. 156-168, XP029698916.
Yoshioka, H. et al., "Expression and epitope analysis of the major allergenic protein Fag e 1 from buckwheat", Journal of Plant Physiology, 2004, vol. 161, pp. 761-767, XP004955349.
Partial Supplementary European Search Report issued Jul. 17, 2023 in European Patent Application No. 20856643.0, 17 pages.
Christiane Kruse Faeste, et al., "Liquid Chromatography and Mass Spectrometry in Food Allergen Detection," Journal of Food Protection, vol. 74, No. 2, XP055371617, 2011, pp. 316-345.
Anita Manfredi, et al., "Multiplex liquid chromatography-tandem mass spectrometry for the detection of wheat, oat, barley and rye prolamins towards the assessment of gluten-free product safety," Analytica Chimica Acta, vol. 895, XP029295381, 2015, pp. 62-70.
Giovanna Visioli, et al., "Gel-Based and Gel-Free Analytical Methods for the Detection of HMW-GS and LMW-GS in Wheat Flour," Food Analytical Methods, vol. 9, XP035609904, 2016, pp. 469-476.
Hiroyuki Nagai, "Development of a Method for Determination of Buckwheat Allergens Using Liquid Chromatography with Tandem Mass Spectrometry," Journal of Aoac International, vol. 100, No. 4, XP009514172, 2017, pp. 1051-1057.

(Continued)

*Primary Examiner* — Kade Ariani
(74) *Attorney, Agent, or Firm* — Oblon, McClelland, Maier & Neustadt, L.L.P.

(57) ABSTRACT

A highly sensitive allergen measurement method is provided. A method for detecting an allergen in a sample, comprising: treating a sample with a protease; and detecting presence or absence of an allergen marker in the enzyme-treated sample by analysis that utilizes chromatographic separation. The allergen comprises buckwheat and wheat.

12 Claims, 2 Drawing Sheets
Specification includes a Sequence Listing.

(56) References Cited

OTHER PUBLICATIONS

Yusuke Seki, et al., "Development of a simple and reliable high-performance liquid chromatography-tandem mass spectrometry approach to simultaneously detect grains specified in food allergen labeling regulation on processed food commodities," Journal of Chromatography A, vol. 1639, XP093061774, 2021, 10 pages.

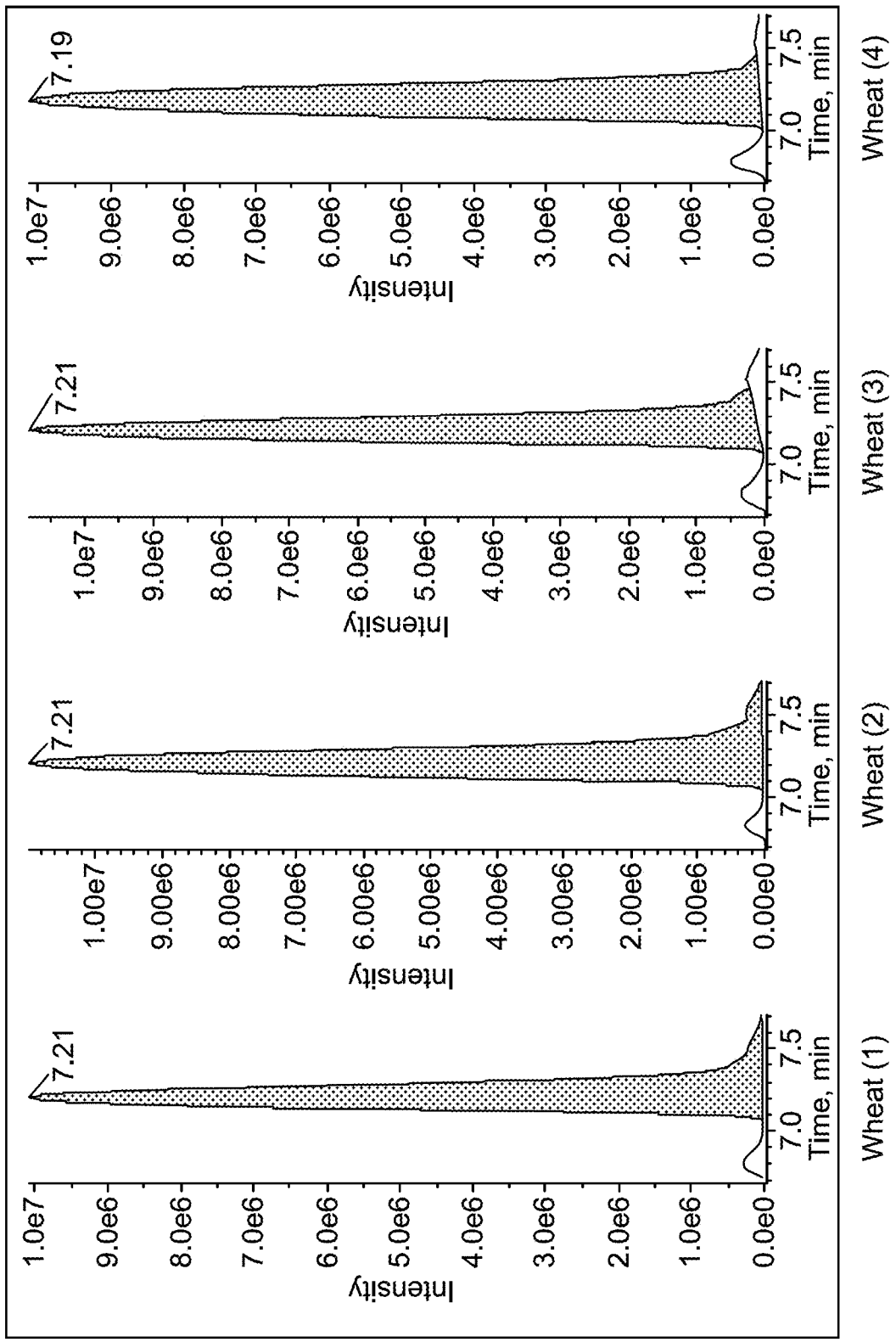

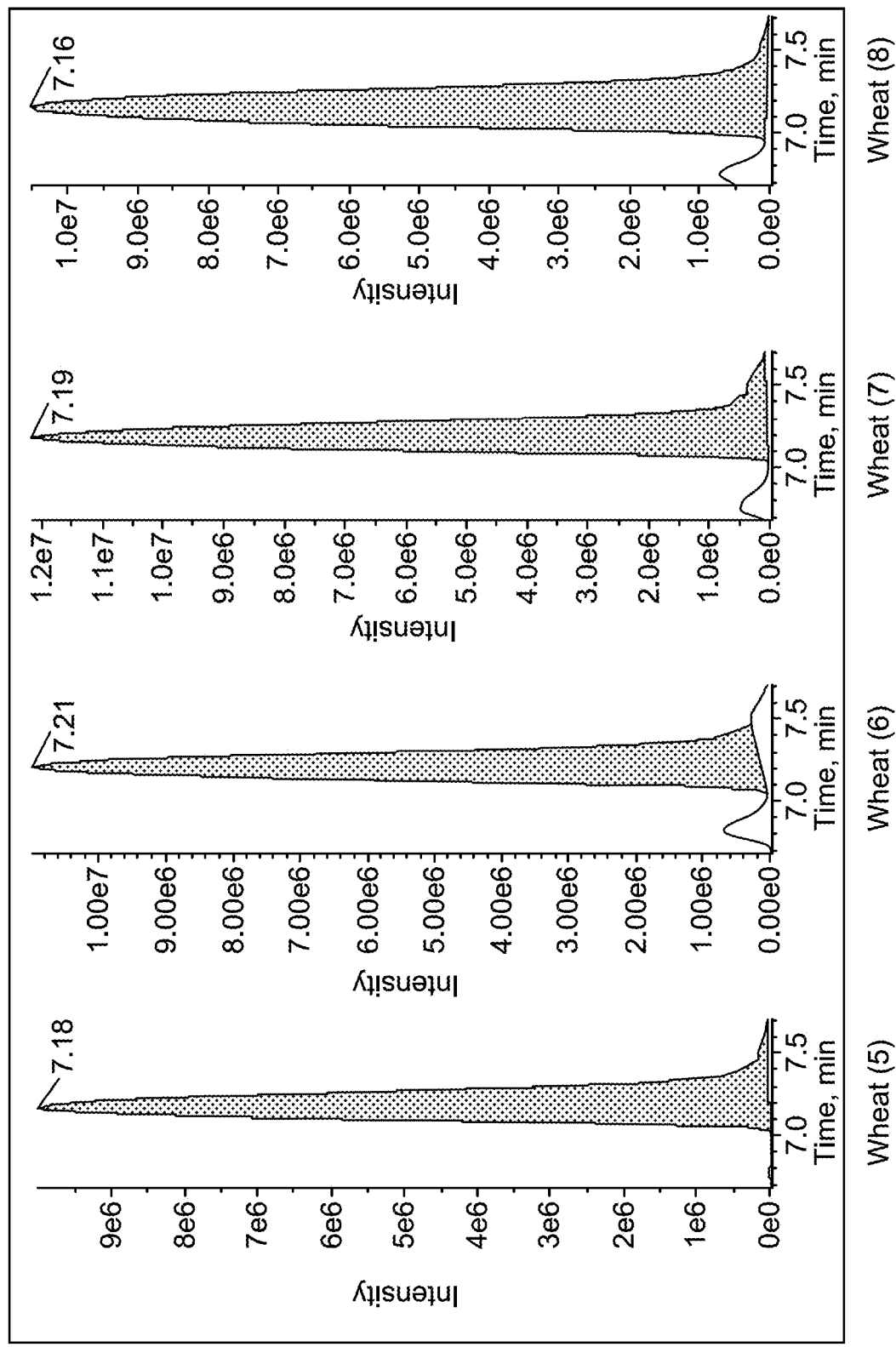

SEQUENCE LISTING

<160> NUMBER OF SEQ ID NOS: 70

<210> SEQ ID NO 1
<211> LENGTH: 7
<212> TYPE: PRT
<213> ORGANISM: Triticum aestivum

<400> SEQUENCE: 1

Gln Ile Pro Glu Gln Ser Arg
1               5

<210> SEQ ID NO 2
<211> LENGTH: 18
<212> TYPE: PRT
<213> ORGANISM: Triticum aestivum

<400> SEQUENCE: 2

Gly Gly Ser Phe Tyr Pro Gly Glu Thr Thr Pro Pro Gln Gln Leu Gln
1               5                   10                  15

Gln Arg

<210> SEQ ID NO 3
<211> LENGTH: 9
<212> TYPE: PRT
<213> ORGANISM: Triticum aestivum

<400> SEQUENCE: 3

```
Ser Val Ala Val Ser Gln Val Ala Arg
1               5

<210> SEQ ID NO 4
<211> LENGTH: 8
<212> TYPE: PRT
<213> ORGANISM: Triticum aestivum

<400> SEQUENCE: 4

Glu Leu Gln Glu Leu Gln Glu Arg
1               5

<210> SEQ ID NO 5
<211> LENGTH: 7
<212> TYPE: PRT
<213> ORGANISM: Fagopyrum esculentum

<400> SEQUENCE: 5

Asn Ala Ile Ile Gly Pro Arg
1               5

<210> SEQ ID NO 6
<211> LENGTH: 7
<212> TYPE: PRT
<213> ORGANISM: Fagopyrum esculentum

<400> SEQUENCE: 6

Asn Ala Ile Leu Gly Pro Arg
1               5

<210> SEQ ID NO 7
<211> LENGTH: 7
<212> TYPE: PRT
<213> ORGANISM: Fagopyrum esculentum

<400> SEQUENCE: 7

Ala Asp Val Phe Asn Pro Arg
1               5

<210> SEQ ID NO 8
<211> LENGTH: 7
<212> TYPE: PRT
<213> ORGANISM: Fagopyrum esculentum

<400> SEQUENCE: 8

Gly Phe Ile Val Gln Ala Arg
1               5

<210> SEQ ID NO 9
<211> LENGTH: 9
<212> TYPE: PRT
<213> ORGANISM: Fagopyrum esculentum

<400> SEQUENCE: 9

Ser Val Phe Asp Asp Asn Val Gln Arg
1               5

<210> SEQ ID NO 10
<211> LENGTH: 9
<212> TYPE: PRT
<213> ORGANISM: Fagopyrum esculentum

<400> SEQUENCE: 10

Val Gln Val Val Gly Asp Glu Gly Arg
```

```
1               5
```

```
<210> SEQ ID NO 11
<211> LENGTH: 7
<212> TYPE: PRT
<213> ORGANISM: Unknown
<220> FEATURE:
<223> OTHER INFORMATION: Obtained from genus Triticum species

<400> SEQUENCE: 11

Ser Asp Cys Gln Val Met Arg
1               5

<210> SEQ ID NO 12
<211> LENGTH: 13
<212> TYPE: PRT
<213> ORGANISM: Unknown
<220> FEATURE:
<223> OTHER INFORMATION: Obtained from genus Triticum species

<400> SEQUENCE: 12

Ala Pro Phe Ala Ser Ile Val Ala Ser Ile Gly Gly Gln
1               5                   10

<210> SEQ ID NO 13
<211> LENGTH: 23
<212> TYPE: PRT
<213> ORGANISM: Unknown
<220> FEATURE:
<223> OTHER INFORMATION: Obtained from genus Triticum species

<400> SEQUENCE: 13

Ser Leu Val Leu Gln Thr Leu Pro Thr Met Cys Asn Val Tyr Val Pro
1               5                   10                  15

Pro Tyr Cys Ser Thr Ile Arg
            20

<210> SEQ ID NO 14
<211> LENGTH: 23
<212> TYPE: PRT
<213> ORGANISM: Unknown
<220> FEATURE:
<223> OTHER INFORMATION: Obtained from genus Triticum species

<400> SEQUENCE: 14

Ser Leu Val Leu Gln Thr Leu Pro Thr Met Cys Asn Val Tyr Val Pro
1               5                   10                  15

Pro Tyr Cys Ser Thr Ile Arg
            20

<210> SEQ ID NO 15
<211> LENGTH: 33
<212> TYPE: PRT
<213> ORGANISM: Unknown
<220> FEATURE:
<223> OTHER INFORMATION: Obtained from genus Triticum species

<400> SEQUENCE: 15

Gln Pro Phe Pro Gln Gln Pro Gln Gln Pro Tyr Pro Gln Gln Pro Gln
1               5                   10                  15

Gln Pro Phe Pro Gln Thr Gln Gln Pro Gln Gln Pro Phe Pro Gln Ser
            20                  25                  30

Lys
```

```
<210> SEQ ID NO 16
<211> LENGTH: 7
<212> TYPE: PRT
<213> ORGANISM: Unknown
<220> FEATURE:
<223> OTHER INFORMATION: Obtained from genus Triticum species

<400> SEQUENCE: 16

Val Ser Ile Ile Leu Pro Arg
1               5

<210> SEQ ID NO 17
<211> LENGTH: 15
<212> TYPE: PRT
<213> ORGANISM: Unknown
<220> FEATURE:
<223> OTHER INFORMATION: Obtained from genus Triticum species

<400> SEQUENCE: 17

Gly Ile Ile Gln Pro Gln Gln Pro Ala Gln Leu Glu Gly Ile Arg
1               5                   10                  15

<210> SEQ ID NO 18
<211> LENGTH: 19
<212> TYPE: PRT
<213> ORGANISM: Unknown
<220> FEATURE:
<223> OTHER INFORMATION: Obtained from genus Triticum species

<400> SEQUENCE: 18

Ala Gln Gly Leu Gly Ile Ile Gln Pro Gln Gln Pro Ala Gln Leu Glu
1               5                   10                  15

Gly Ile Arg

<210> SEQ ID NO 19
<211> LENGTH: 23
<212> TYPE: PRT
<213> ORGANISM: Unknown
<220> FEATURE:
<223> OTHER INFORMATION: Obtained from genus Triticum species

<400> SEQUENCE: 19

Asn Phe Leu Leu Gln Gln Cys Asn His Val Ser Leu Val Ser Ser Leu
1               5                   10                  15

Val Ser Ile Ile Leu Pro Arg
            20

<210> SEQ ID NO 20
<211> LENGTH: 26
<212> TYPE: PRT
<213> ORGANISM: Unknown
<220> FEATURE:
<223> OTHER INFORMATION: Obtained from genus Triticum species

<400> SEQUENCE: 20

Pro Ser Gly Gln Val Gln Trp Pro Gln Gln Pro Phe Pro Gln Pro
1               5                   10                  15

Gln Gln Pro Phe Cys Gln Gln Pro Gln Arg
            20                  25

<210> SEQ ID NO 21
<211> LENGTH: 7
<212> TYPE: PRT
<213> ORGANISM: Unknown
<220> FEATURE:
<223> OTHER INFORMATION: Obtained from genus Triticum species
```

```
<400> SEQUENCE: 21

Val Asn Val Pro Leu Tyr Arg
1               5

<210> SEQ ID NO 22
<211> LENGTH: 10
<212> TYPE: PRT
<213> ORGANISM: Unknown
<220> FEATURE:
<223> OTHER INFORMATION: Obtained from genus Triticum species

<400> SEQUENCE: 22

Leu Glu Val Met Thr Ser Ile Ala Leu Arg
1               5                   10

<210> SEQ ID NO 23
<211> LENGTH: 14
<212> TYPE: PRT
<213> ORGANISM: Unknown
<220> FEATURE:
<223> OTHER INFORMATION: Obtained from genus Triticum species

<400> SEQUENCE: 23

Thr Thr Thr Ser Val Pro Phe Gly Val Gly Thr Gly Val Gly
1               5                   10

<210> SEQ ID NO 24
<211> LENGTH: 15
<212> TYPE: PRT
<213> ORGANISM: Unknown
<220> FEATURE:
<223> OTHER INFORMATION: Obtained from genus Triticum species

<400> SEQUENCE: 24

Thr Thr Thr Ser Val Pro Phe Gly Val Gly Thr Gly Val Gly Ala
1               5                   10                  15

<210> SEQ ID NO 25
<211> LENGTH: 16
<212> TYPE: PRT
<213> ORGANISM: Unknown
<220> FEATURE:
<223> OTHER INFORMATION: Obtained from genus Triticum species

<400> SEQUENCE: 25

Thr Thr Thr Ser Val Pro Phe Gly Val Gly Thr Gly Val Gly Ala Tyr
1               5                   10                  15

<210> SEQ ID NO 26
<211> LENGTH: 14
<212> TYPE: PRT
<213> ORGANISM: Unknown
<220> FEATURE:
<223> OTHER INFORMATION: Obtained from genus Triticum species

<400> SEQUENCE: 26

Ile Leu Pro Thr Met Cys Ser Val Asn Val Pro Leu Tyr Arg
1               5                   10

<210> SEQ ID NO 27
<211> LENGTH: 28
<212> TYPE: PRT
<213> ORGANISM: Unknown
<220> FEATURE:
<223> OTHER INFORMATION: Obtained from genus Triticum species
```

```
<400> SEQUENCE: 27

Ser Gln Met Leu Gln Gln Ser Ser Cys His Val Met Gln Gln Gln Cys
1               5                   10                  15

Cys Gln Gln Leu Pro Gln Ile Pro Gln Gln Ser Arg
            20                  25

<210> SEQ ID NO 28
<211> LENGTH: 33
<212> TYPE: PRT
<213> ORGANISM: Unknown
<220> FEATURE:
<223> OTHER INFORMATION: Obtained from genus Triticum species

<400> SEQUENCE: 28

Ser Gln Met Leu Gln Gln Ser Ser Cys His Val Met Gln Gln Gln Cys
1               5                   10                  15

Cys Gln Gln Leu Pro Gln Ile Pro Gln Gln Ser Arg Tyr Glu Ala Ile
            20                  25                  30

Arg

<210> SEQ ID NO 29
<211> LENGTH: 13
<212> TYPE: PRT
<213> ORGANISM: Unknown
<220> FEATURE:
<223> OTHER INFORMATION: Obtained from genus Triticum species

<400> SEQUENCE: 29

Ala Pro Phe Ala Ser Ile Val Ala Gly Ile Gly Gly Gln
1               5                   10

<210> SEQ ID NO 30
<211> LENGTH: 13
<212> TYPE: PRT
<213> ORGANISM: Unknown
<220> FEATURE:
<223> OTHER INFORMATION: Obtained from genus Triticum species

<400> SEQUENCE: 30

Ala Pro Phe Ala Ser Ile Val Ala Gly Ile Gly Gly Gln
1               5                   10

<210> SEQ ID NO 31
<211> LENGTH: 14
<212> TYPE: PRT
<213> ORGANISM: Unknown
<220> FEATURE:
<223> OTHER INFORMATION: Obtained from genus Triticum species

<400> SEQUENCE: 31

Arg Ala Pro Phe Ala Ser Ile Val Ala Gly Ile Gly Gly Gln
1               5                   10

<210> SEQ ID NO 32
<211> LENGTH: 23
<212> TYPE: PRT
<213> ORGANISM: Unknown
<220> FEATURE:
<223> OTHER INFORMATION: Obtained from genus Triticum species

<400> SEQUENCE: 32

Ser Leu Val Leu Gln Thr Leu Pro Ser Met Cys Asn Val Tyr Val Pro
1               5                   10                  15

Pro Glu Cys Ser Ile Met Arg
```

<210> SEQ ID NO 33
<211> LENGTH: 28
<212> TYPE: PRT
<213> ORGANISM: Unknown
<220> FEATURE:
<223> OTHER INFORMATION: Obtained from genus Triticum species

<400> SEQUENCE: 33

Gln Gln Pro Phe Pro Gln Thr Gln Gln Pro Gln Pro Phe Pro Gln
1               5                   10                  15

Gln Pro Gln Gln Pro Phe Pro Gln Thr Gln Gln Pro
            20                  25

<210> SEQ ID NO 34
<211> LENGTH: 12
<212> TYPE: PRT
<213> ORGANISM: Unknown
<220> FEATURE:
<223> OTHER INFORMATION: Obtained from genus Triticum species

<400> SEQUENCE: 34

Gln Ile Pro Glu Gln Ser Arg His Glu Ser Ile Arg
1               5                   10

<210> SEQ ID NO 35
<211> LENGTH: 14
<212> TYPE: PRT
<213> ORGANISM: Unknown
<220> FEATURE:
<223> OTHER INFORMATION: Obtained from genus Triticum species

<400> SEQUENCE: 35

Val Phe Leu Gln Gln Gln Cys Ile Pro Val Ala Met Gln Arg
1               5                   10

<210> SEQ ID NO 36
<211> LENGTH: 19
<212> TYPE: PRT
<213> ORGANISM: Unknown
<220> FEATURE:
<223> OTHER INFORMATION: Obtained from genus Triticum species

<400> SEQUENCE: 36

Gln Gln Gln Ile Pro Val Ile His Pro Ser Val Leu Gln Gln Leu Asn
1               5                   10                  15

Pro Cys Lys

<210> SEQ ID NO 37
<211> LENGTH: 8
<212> TYPE: PRT
<213> ORGANISM: Unknown
<220> FEATURE:
<223> OTHER INFORMATION: Obtained from genus Triticum species

<400> SEQUENCE: 37

Glu Leu Gln Glu Leu Gln Glu Arg
1               5

<210> SEQ ID NO 38
<211> LENGTH: 11
<212> TYPE: PRT
<213> ORGANISM: Unknown
<220> FEATURE:
<223> OTHER INFORMATION: Obtained from genus Triticum species -continued

<400> SEQUENCE: 38

Leu Glu Gly Gly Asp Ala Leu Ser Ala Ser Gln
1               5                   10

<210> SEQ ID NO 39
<211> LENGTH: 10
<212> TYPE: PRT
<213> ORGANISM: Unknown
<220> FEATURE:
<223> OTHER INFORMATION: Obtained from genus Triticum species

<400> SEQUENCE: 39

Ile Phe Trp Gly Ile Pro Ala Leu Leu Lys
1               5                   10

<210> SEQ ID NO 40
<211> LENGTH: 10
<212> TYPE: PRT
<213> ORGANISM: Unknown
<220> FEATURE:
<223> OTHER INFORMATION: Obtained from genus Triticum species

<400> SEQUENCE: 40

Ile Phe Trp Gly Ile Pro Ala Leu Leu Lys
1               5                   10

<210> SEQ ID NO 41
<211> LENGTH: 11
<212> TYPE: PRT
<213> ORGANISM: Unknown
<220> FEATURE:
<223> OTHER INFORMATION: Obtained from genus Triticum species

<400> SEQUENCE: 41

Ile Phe Trp Gly Ile Pro Ala Leu Leu Lys Arg
1               5                   10

<210> SEQ ID NO 42
<211> LENGTH: 11
<212> TYPE: PRT
<213> ORGANISM: Unknown
<220> FEATURE:
<223> OTHER INFORMATION: Obtained from genus Triticum species

<400> SEQUENCE: 42

Gly Glu Ala Ser Glu Gln Leu Gln Cys Glu Arg
1               5                   10

<210> SEQ ID NO 43
<211> LENGTH: 11
<212> TYPE: PRT
<213> ORGANISM: Unknown
<220> FEATURE:
<223> OTHER INFORMATION: Obtained from genus Triticum species

<400> SEQUENCE: 43

Ile Phe Trp Gly Ile Pro Ala Leu Leu Lys Arg
1               5                   10

<210> SEQ ID NO 44
<211> LENGTH: 12
<212> TYPE: PRT
<213> ORGANISM: Unknown
<220> FEATURE:
<223> OTHER INFORMATION: Obtained from genus Triticum species

```
<400> SEQUENCE: 44

Glu Gly Glu Ala Ser Glu Gln Leu Gln Cys Glu Arg
1               5                   10

<210> SEQ ID NO 45
<211> LENGTH: 13
<212> TYPE: PRT
<213> ORGANISM: Unknown
<220> FEATURE:
<223> OTHER INFORMATION: Obtained from genus Triticum species

<400> SEQUENCE: 45

Ala Gln Gln Leu Ala Ala Gln Leu Pro Ala Met Cys Arg
1               5                   10

<210> SEQ ID NO 46
<211> LENGTH: 9
<212> TYPE: PRT
<213> ORGANISM: Unknown
<220> FEATURE:
<223> OTHER INFORMATION: Obtained from genus Triticum species

<400> SEQUENCE: 46

Ser Val Ala Val Ser Gln Val Ala Arg
1               5

<210> SEQ ID NO 47
<211> LENGTH: 10
<212> TYPE: PRT
<213> ORGANISM: Unknown
<220> FEATURE:
<223> OTHER INFORMATION: Obtained from genus Triticum species

<400> SEQUENCE: 47

Gln Val Val Asp Gln Gln Leu Ala Gly Arg
1               5                   10

<210> SEQ ID NO 48
<211> LENGTH: 11
<212> TYPE: PRT
<213> ORGANISM: Unknown
<220> FEATURE:
<223> OTHER INFORMATION: Obtained from genus Triticum species

<400> SEQUENCE: 48

Glu Leu Gln Glu Ser Ser Leu Glu Ala Cys Arg
1               5                   10

<210> SEQ ID NO 49
<211> LENGTH: 13
<212> TYPE: PRT
<213> ORGANISM: Unknown
<220> FEATURE:
<223> OTHER INFORMATION: Obtained from genus Triticum species

<400> SEQUENCE: 49

Ala Gln Gln Pro Ala Thr Gln Leu Pro Thr Val Cys Arg
1               5                   10

<210> SEQ ID NO 50
<211> LENGTH: 17
<212> TYPE: PRT
<213> ORGANISM: Unknown
<220> FEATURE:
<223> OTHER INFORMATION: Obtained from genus Triticum species

<400> SEQUENCE: 50
```

-continued

```
Gln Leu Gln Cys Glu Arg Glu Leu Gln Glu Ser Ser Leu Glu Ala Cys
1               5                   10                  15

Arg

<210> SEQ ID NO 51
<211> LENGTH: 20
<212> TYPE: PRT
<213> ORGANISM: Unknown
<220> FEATURE:
<223> OTHER INFORMATION: Obtained from genus Triticum species

<400> SEQUENCE: 51

Gln Val Val Asp Gln Gln Leu Ala Gly Arg Leu Pro Trp Ser Thr Gly
1               5                   10                  15

Leu Gln Met Arg
            20

<210> SEQ ID NO 52
<211> LENGTH: 37
<212> TYPE: PRT
<213> ORGANISM: Unknown
<220> FEATURE:
<223> OTHER INFORMATION: Obtained from genus Triticum species

<400> SEQUENCE: 52

Gln Gln Pro Val Gln Gly Gln Gln Pro Glu Gln Gly Gln Gln Pro Gly
1               5                   10                  15

Gln Trp Gln Gln Gly Tyr Tyr Pro Thr Ser Pro Gln Gln Leu Gly Gln
            20                  25                  30

Gly Gln Gln Pro Arg
        35

<210> SEQ ID NO 53
<211> LENGTH: 35
<212> TYPE: PRT
<213> ORGANISM: Unknown
<220> FEATURE:
<223> OTHER INFORMATION: Obtained from genus Triticum species

<400> SEQUENCE: 53

Gln Gly Tyr Tyr Pro Thr Ser Leu Gln Gln Pro Gly Gln Gly Gln Gln
1               5                   10                  15

Ile Gly Gln Gly Gln Gln Gly Tyr Tyr Pro Thr Ser Pro Gln His Thr
            20                  25                  30

Gly Gln Arg
        35

<210> SEQ ID NO 54
<211> LENGTH: 6
<212> TYPE: PRT
<213> ORGANISM: Unknown
<220> FEATURE:
<223> OTHER INFORMATION: Obtained from genus Triticum species

<400> SEQUENCE: 54

Gln Trp Leu Gln Pro Arg
1               5

<210> SEQ ID NO 55
<211> LENGTH: 11
<212> TYPE: PRT
<213> ORGANISM: Unknown
<220> FEATURE:
```

-continued

```
<223> OTHER INFORMATION: Obtained from genus Triticum species

<400> SEQUENCE: 55

Leu Glu Gly Gly Asp Ala Leu Leu Ala Ser Gln
1               5                   10

<210> SEQ ID NO 56
<211> LENGTH: 11
<212> TYPE: PRT
<213> ORGANISM: Unknown
<220> FEATURE:
<223> OTHER INFORMATION: Obtained from genus Triticum species

<400> SEQUENCE: 56

Leu Glu Gly Gly Asp Ala Leu Leu Ala Ser Gln
1               5                   10

<210> SEQ ID NO 57
<211> LENGTH: 9
<212> TYPE: PRT
<213> ORGANISM: Unknown
<220> FEATURE:
<223> OTHER INFORMATION: Obtained from genus Triticum

<400> SEQUENCE: 57

Ser Val Ala Val Ser Gln Val Ala Arg
1               5

<210> SEQ ID NO 58
<211> LENGTH: 16
<212> TYPE: PRT
<213> ORGANISM: Unknown
<220> FEATURE:
<223> OTHER INFORMATION: Obtained from genus Triticum

<400> SEQUENCE: 58

Glu His Gly Ala Gln Glu Gly Gln Ala Gly Thr Gly Ala Phe Pro Arg
1               5                   10                  15

<210> SEQ ID NO 59
<211> LENGTH: 10
<212> TYPE: PRT
<213> ORGANISM: Unknown
<220> FEATURE:
<223> OTHER INFORMATION: Obtained from genus Triticum

<400> SEQUENCE: 59

Gln Val Val Asp Gln Gln Leu Ala Gly Arg
1               5                   10

<210> SEQ ID NO 60
<211> LENGTH: 10
<212> TYPE: PRT
<213> ORGANISM: Unknown
<220> FEATURE:
<223> OTHER INFORMATION: Obtained from genus Triticum

<400> SEQUENCE: 60

Ile Phe Trp Gly Ile Pro Ala Leu Leu Lys
1               5                   10

<210> SEQ ID NO 61
<211> LENGTH: 10
<212> TYPE: PRT
<213> ORGANISM: Unknown
<220> FEATURE:
<223> OTHER INFORMATION: Obtained from genus Triticum
```

```
<400> SEQUENCE: 61

Leu Pro Trp Ser Thr Gly Leu Gln Met Arg
1               5                   10

<210> SEQ ID NO 62
<211> LENGTH: 11
<212> TYPE: PRT
<213> ORGANISM: Unknown
<220> FEATURE:
<223> OTHER INFORMATION: Obtained from genus Triticum

<400> SEQUENCE: 62

Tyr Asp Pro Thr Ala Tyr Asn Thr Ile Leu Arg
1               5                   10

<210> SEQ ID NO 63
<211> LENGTH: 15
<212> TYPE: PRT
<213> ORGANISM: Fagopyrum esculentum

<400> SEQUENCE: 63

Gly Gln Ile Leu Val Val Pro Gln Gly Phe Ala Val Val Leu Lys
1               5                   10                  15

<210> SEQ ID NO 64
<211> LENGTH: 9
<212> TYPE: PRT
<213> ORGANISM: Fagopyrum esculentum

<400> SEQUENCE: 64

Glu Gly Leu Glu Trp Val Glu Leu Lys
1               5

<210> SEQ ID NO 65
<211> LENGTH: 9
<212> TYPE: PRT
<213> ORGANISM: Fagopyrum esculentum

<400> SEQUENCE: 65

Asn Phe Phe Leu Ala Gly Gln Ser Lys
1               5

<210> SEQ ID NO 66
<211> LENGTH: 13
<212> TYPE: PRT
<213> ORGANISM: Fagopyrum esculentum

<400> SEQUENCE: 66

Asn Asp Asp Asn Ala Ile Thr Ser Pro Ile Ala Gly Lys
1               5                   10

<210> SEQ ID NO 67
<211> LENGTH: 6
<212> TYPE: PRT
<213> ORGANISM: Triticum aestivum

<400> SEQUENCE: 67

Glu Gly Ile Arg Ser Leu
1               5

<210> SEQ ID NO 68
<211> LENGTH: 6
<212> TYPE: PRT
<213> ORGANISM: Triticum aestivum
```

```
-continued

<400> SEQUENCE: 68

Ala Arg Ser Gln Met Leu
1               5

<210> SEQ ID NO 69
<211> LENGTH: 8
<212> TYPE: PRT
<213> ORGANISM: Triticum aestivum

<400> SEQUENCE: 69

Glu Ala Ile Arg Ala Ile Ile Tyr
1               5

<210> SEQ ID NO 70
<211> LENGTH: 13
<212> TYPE: PRT
<213> ORGANISM: Triticum aestivum

<400> SEQUENCE: 70

Val Gln Gln Gln Ile Pro Val Val Gln Pro Ser Ile Leu
1               5                   10
```

US 12,493,046 B2

ALLERGEN DETECTION MARKER AND ALLERGEN DETECTION METHOD USING SAME

TECHNICAL FIELD

The present invention relates to a marker for detecting an allergen in a sample and an allergen detection method using the same.

BACKGROUND ART

Food allergies are caused by excessive immune responses to allergens (allergic substances) in foods. Many cases of health damage caused by eating foods containing allergens have been reported. In our country, labeling of 7 specific raw materials (eggs, milk, wheat, peanuts, shrimps, buckwheat, crabs) which have high incidence and severe symptoms of food allergies is obligatory in foods.

Currently, ELISA, Western blotting, and PCR are used as official assay methods as methods for analyzing allergenic proteins. However, ELISA may produce false negatives or false positives due to antibody specificity or cross-reactivity. Western blotting is a complicated test method. PCR cannot be applied to foodstuffs not containing DNA. There is a need to develop a new allergen detection method that is quick, simple, and highly robust and can overcome the shortcomings of these existing assay methods.

In recent years, analysis of allergens by LC-MS has been developed as a highly sensitive and highly selective allergen detection method. Patent Literature 1 describes a method for detecting an allergen selected from the group consisting of ovalbumin, lysoteam, casein, lactoglobulin, high molecular weight glutenin, low molecular weight glutenin, wheat protein, rye protein, oat protein, barley protein, Indian mustard protein, sesame protein, macadamia nut protein, pistachio protein, Brazil nut protein, walnut protein, peanut protein, and hazelnut protein in a sample, including the step of detecting a peptide having a specific sequence obtained by enzymolysis of the allergen by LC-MS/MS. Patent Literature 2 describes a method for measuring an allergen content in a composition, including the step of forming an extract containing an allergen from a sample composition, and measuring an amount of the allergen in the extract using LC-UV/MS or LC-MS. Patent Literature 3 describes a method for detecting an allergen polypeptide derived from buckwheat, crustaceans, milk, eggs, or peanuts in a sample using LC-MS/MS.

CITATION LIST

Patent Literature

Patent Literature 1: JP 2014-525588 A
Patent Literature 2: JP 2013-539039 A
Patent Literature 3: WO 2018/016551

SUMMARY OF INVENTION

Technical Problem

There is a need for a method by which allergens in samples such as foods can be detected more easily and with high sensitivity. In particular, a method for detecting low molecular weight (LMW) glutenin, which is a wheat-derived allergen, with sufficient sensitivity and specificity has not been previously found, and there is a need for a method for detecting this with high sensitivity.

Solution to Problem

The present inventors found that specific amino acid sequences contained in wheat glutenin or buckwheat can be used as markers for wheat- or buckwheat-derived allergens, and thus, by detecting the amino acid sequences, allergen wheat or buckwheat can be detected with high sensitivity.

In one embodiment, the present invention provides:
[1] A method for detecting an allergen in a sample, including: treating a sample with a protease; and
detecting presence or absence of an allergen-derived polypeptide in the enzyme-treated sample by analysis that utilizes chromatographic separation,
wherein the allergen-derived polypeptide comprises one or more selected from the group consisting of polypeptides consisting of amino acid sequences of SEQ ID NOs: 1, 2, 5, 6 and 7.
[2] The method according to [1], wherein the analysis that utilizes chromatographic separation is liquid chromatography-tandem mass spectrometry (LC-MS/MS).
[3] The method according to [1] or [2], wherein the allergen comprises wheat, and the allergen-derived polypeptide comprises one or more selected from the group consisting of polypeptides consisting of amino acid sequences of SEQ ID NOs: 1 and 2.
[4] The method according to [3], wherein the allergen-derived polypeptide further comprises one or more selected from the group consisting of polypeptides consisting of amino acid sequences of SEQ ID NOs: 3 and 4.
[5] The method according to [3] or [4], wherein the allergen-derived polypeptide further comprises one or more selected from the group consisting of polypeptides consisting of amino acid sequences of SEQ ID NOs: 67 to 70.
[6] The method according to [1] or [2], wherein the allergen comprises buckwheat, and the allergen-derived polypeptide comprises one or more selected from the group consisting of polypeptides consisting of amino acid sequences of SEQ ID NOs: 5 to 7.
[7] The method according to [6], wherein the allergen-derived polypeptide further comprises one or more selected from the group consisting of polypeptides consisting of amino acid sequences of SEQ ID NO: 8 to 10.
[8] The method according to [1] or [2], wherein the allergen comprises wheat and buckwheat, and the allergen-derived polypeptide comprises any one or more of polypeptides consisting of amino acid sequences of SEQ ID NOs: 1 and 2 and any one or more of polypeptides consisting of amino acid sequences of SEQ ID NOs: 5 to 7.
[9] The method according to [8], wherein the allergen-derived polypeptide further comprises one or more selected from the group consisting of polypeptides consisting of amino acid sequences of SEQ ID NOs: 3 and 4.
[10] The method according to [8] or [9], wherein the allergen-derived polypeptide further comprises one or more selected from the group consisting of polypeptides consisting of amino acid sequences of SEQ ID NOs: 67 to 70.
[11] The method according to any one of [8] to [10], wherein the allergen-derived polypeptide further comprises one or more selected from the group consisting of polypeptides consisting of amino acid sequences of SEQ ID NO: 8 to 10.

[12] The method according to [8], wherein the allergen-derived polypeptide comprises polypeptides consisting of amino acid sequences of SEQ ID NOs: 1, 2, 5, 6 and 7.

[13] A wheat allergen detection marker, consisting of:
an amino acid sequence of SEQ ID NO: 1 or 2.

[14] A buckwheat allergen detection marker, consisting of:
an amino acid sequence of SEQ ID NO: 5, 6, or 7.

[15] A wheat allergen detection marker, consisting of:
any one of amino acid sequence of SEQ ID NOs: 67 to 70.

Advantageous Effects of Invention

The present invention provides a highly sensitive allergen detection method capable of detecting the presence of a trace amount of allergens (wheat or buckwheat) in samples such as foods. In particular, according to the present invention, LMW glutenin, which has been impossible to detect with high sensitivity so far, can be detected.

BRIEF DESCRIPTION OF DRAWINGS

FIG. 1 is a chromatogram showing peaks of the peptide of SEQ ID NO: 1 detected in eight types of wheat samples.

DESCRIPTION OF EMBODIMENTS

The present invention provides a method for detecting an allergen in a sample. In the present invention, examples of objects to be subjected to allergen detection include, but are not limited to, foods, cosmetics, pharmaceuticals, raw materials thereof, and apparatuses used in manufacturing processes thereof. Those obtained by subjecting these objects to ordinary pretreatments such as crush, dissolution, suspension, extraction, and combinations thereof can be used as samples of the method of the present invention. Alternatively, when objects are apparatuses, for example, cleaning solutions or wiped samples thereof and those obtained by subjecting the objects to crush, dissolution, suspension, extraction, or combinations thereof can be used as samples of the method of the present invention. The method for preparing samples used in the method of the present invention is not limited to the above, and can include any method that can be used for preparing samples for protease treatment described below.

In the method of the present invention, a prepared sample is treated with a protease. Examples of the protease used in the method of the present invention include trypsin, chymotrypsin, elastase, and thermolysin, and the protease is preferably trypsin or chymotrypsin. For example, all samples can be treated with either trypsin or chymotrypsin, or trypsin-treated samples and chymotrypsin-treated samples can be prepared respectively. More preferably, trypsin is used when polypeptides consisting of amino acid sequences of SEQ ID NOs: 1 to 10 described later are detected, while chymotrypsin is used when polypeptides consisting of amino acid sequences of SEQ ID NOs: 67 to 70 described later are detected. The treatment conditions can be appropriately selected according to the type of enzymes. For example, in the case of trypsin, treatment conditions of the enzyme concentration of 1000 to 20000 U, 25 to 45° C., pH 7 to 9, and 4 to 24 hours are preferable. Similar conditions are preferable for chymotrypsin. The enzymatic treatment degrades the protein molecule of a target allergen to produce polypeptides derived from the allergen. Thus, when the sample contains a target allergen, the sample after the enzyme treatment contains polypeptides derived from the target allergen. Meanwhile, when the sample does not contain a target allergen, the sample after the enzyme treatment does not contain polypeptides derived from the target allergen.

Thus, the presence or absence of the target allergen in a sample treated with the protease can be determined by detecting the presence or absence of one or more target allergen-derived polypeptide in the sample. Examples of the target allergen detected by the method of the present invention include wheat and buckwheat.

When the target allergen is wheat, in the method of the present invention, any one or more degradation product of γ-gliadin, low molecular weight (LMW) glutenin, and high molecular weight (HMW) glutenin is detected as an allergen-derived polypeptide. In one embodiment of the method of the present invention, one or both of a LMW glutenin-derived polypeptide consisting of an amino acid sequence of SEQ ID NO: 1 and a HMW glutenin-derived polypeptide consisting of an amino acid sequence of SEQ ID NO: 2 shown below are detected as allergen-derived polypeptides. Preferably, at least a polypeptide consisting of an amino acid sequence of SEQ ID NO: 1 is detected as an allergen-derived polypeptide. Further, in addition to a polypeptide consisting of an amino acid sequence of SEQ ID NO: 1 or 2, one or more selected from the group consisting of a polypeptide consisting of an amino acid sequence of SEQ ID NO: 3 and a polypeptide consisting of an amino acid sequence of SEQ ID NO: 4 shown below can be detected as an allergen-derived polypeptide. Thus, in the present invention, each of the polypeptides of SEQ ID NOs: 1 to 4 can be used as a polypeptide marker for detecting a wheat allergen.

```
QIPEQSR (SEQ ID NO: 1): LMW glutenin-derived
polypeptide

GGSFYPGETTPPQQLQQR (SEQ ID NO: 2): HMW glutenin-
derived polypeptide

SVAVSQVAR (SEQ ID NO: 3): HMW glutenin-derived
polypeptide

ELQELQER (SEQ ID NO: 4): HMW glutenin-derived
polypeptide
```

When the target allergen is wheat, in another embodiment of the method of the present invention, one or more selected from the group consisting of a γ-gliadin-derived polypeptide consisting of an amino acid sequence of SEQ ID NO: 67 and a LMW glutenin-derived polypeptides consisting of amino acid sequences of SEQ ID NO: 68 to 70 shown below is detected as an allergen-derived polypeptide. Preferably, at least two, more preferably all, of polypeptides consisting of amino acid sequences of SEQ ID NOs: 67 to 70 are detected as allergen-derived polypeptides. Thus, in the present invention, each of the polypeptides of SEQ ID NOs: 67 to 70 can be used as a polypeptide marker for detecting a wheat allergen.

```
EGIRSL (SEQ ID NO: 67): γ-gliadin-derived
polypeptide

ARSQML (SEQ ID NO: 68): LMW glutenin-derived
polypeptide
```

-continued

EAIRAIIY (SEQ ID NO: 69): LMW glutenin-derived polypeptide

VQQQIPVVQPSIL (SEQ ID NO: 70): LMW glutenin-derived polypeptide

Alternatively, a combination of one or more selected from the group consisting of polypeptides consisting of amino acid sequences of SEQ ID NOs: 1 to 4 and one or more selected from the group consisting of polypeptides consisting of amino acid sequences of SEQ ID NOs: 67 to 70 can be detected as a wheat allergen-derived polypeptide. Examples of the combination include combinations of one or more selected from the group consisting of polypeptides consisting of amino acid sequences of SEQ ID NOs: 1 and 2 and one or more selected from the group consisting of polypeptides consisting of amino acid sequences of SEQ ID NOs: 67 to 70; combinations of one or more selected from the group consisting of polypeptides consisting of amino acid sequences of SEQ ID NOs: 1 and 2, one or more selected from the group consisting of polypeptides consisting of amino acid sequences of SEQ ID NOs: 3 and 4, and one or more selected from the group consisting of polypeptides consisting of amino acid sequences of SEQ ID NOs: 67 to 70; combinations of all of polypeptides consisting of amino acid sequences of SEQ ID NOs: 1 and 2 and all of polypeptides consisting of amino acid sequences of SEQ ID NOs: 67 to 70; and combinations of polypeptides consisting of amino acid sequences of SEQ ID NOs: 1 to 4 and 67 to 70.

When the target allergen is buckwheat, in the method of the present invention, degradation products of 11S globulin and/or 13S globulin are detected as allergen-derived polypeptides. More specifically, one or more selected from the group consisting of a 11S globulin and 13S globulin-derived polypeptide consisting of an amino acid sequence of SEQ ID NO: 5, a 11S globulin and 13S globulin-derived polypeptide consisting of an amino acid sequence of SEQ ID NO: 6, and a 13S globulin-derived polypeptide consisting of an amino acid sequence of SEQ ID NO: 7 shown below is detected as an allergen-derived polypeptide. Preferably, all of polypeptides consisting of amino acid sequences of SEQ ID NOs: 5 to 7 are detected as allergen-derived polypeptides. Further, in addition to a polypeptide consisting of an amino acid sequence of SEQ ID NO: 5, 6, or 7, one or more selected from the group consisting of polypeptides consisting of amino acid sequences of SEQ ID NOs: 8 to 10 shown below can be detected as an allergen-derived polypeptide. Thus, in the present invention, each of the polypeptides of SEQ ID NOs: 5 to 10 can be used as a polypeptide marker for detecting a buckwheat allergen.

NAIIGPR (SEQ ID NO: 5): 11S globulin/13S globulin-derived polypeptide

NAILGPR (SEQ ID NO: 6): 11S globulin/13S globulin-derived polypeptide

ADVFNPR (SEQ ID NO: 7): 13S globulin-derived polypeptide

GFIVQAR (SEQ ID NO: 8): 13S globulin-derived polypeptide

SVFDDNVQR (SEQ ID NO: 9): 13S globulin-derived polypeptide

VQVVGDEGR (SEQ ID NO: 10): 13S globulin-derived polypeptide

In one embodiment, when target allergens are wheat and buckwheat, allergen-derived polypeptides to be detected preferably comprise any one or more of polypeptides consisting of amino acid sequences of SEQ ID NOs: 1 and 2 and any one or more of polypeptides consisting of amino acid sequences of SEQ ID NOs: 5 to 7, more preferably comprises a polypeptide consisting of an amino acid sequence of SEQ ID NO: 1 and any one or more of polypeptides consisting of amino acid sequences of SEQ ID NOs: 5 to 7, and still more preferably comprise all of polypeptides consisting of amino acid sequences of SEQ ID NOs: 1, 2, 5, 6 and 7. Allergen-derived polypeptides to be detected can further comprise any one or more of polypeptides consisting of amino acid sequences of SEQ ID NOs: 3 and 4. For example, when target allergens of the method of the present invention are wheat and buckwheat, preferable examples of allergen-derived polypeptides to be detected include combinations of a polypeptide consisting of an amino acid sequence of SEQ ID NO: 1 and any one or more of polypeptides consisting of amino acid sequences of SEQ ID NOs: 5 to 7; a combination of a polypeptide consisting of an amino acid sequence of SEQ ID NO: 1 and all of polypeptides consisting of amino acid sequences of SEQ ID NOs: 5 to 7; a combination of all of polypeptides consisting of amino acid sequences of SEQ ID NOs: 1 and 2 and all of polypeptides consisting of amino acid sequences of SEQ ID NOs: 5 to 7; a combination of all of polypeptides consisting of amino acid sequences of SEQ ID NOs: 1 to 4 and all of polypeptides consisting of amino acid sequences of SEQ ID NOs: 5 to 7; and a combination of all of polypeptides consisting of amino acid sequences of SEQ ID NOs: 1 and 2 and all of polypeptides consisting of amino acid sequences of SEQ ID NOs: 5 to 10, and a more preferable example is all of polypeptides consisting of amino acid sequences of SEQ ID NOs: 1 to 10.

In another embodiment, when target allergens are wheat and buckwheat, allergen-derived polypeptides to be detected preferably comprise any one or more of polypeptides consisting of amino acid sequences of SEQ ID NOs: 67 to 70 and any one or more of polypeptides consisting of amino acid sequences of SEQ ID NOs: 5 to 7, and more preferably comprise all of polypeptides consisting of amino acid sequences of SEQ ID NOs: 67 to 70, 5, 6 and 7. For example, when target allergens of the method of the present invention are wheat and buckwheat, preferable examples of allergen-derived polypeptides to be detected comprise combinations of any one or more of polypeptides consisting of amino acid sequences of SEQ ID NOs: 67 to 70 and any one or more of polypeptides consisting of amino acid sequences of SEQ ID NOs: 5 to 7; a combination of all of polypeptides consisting of amino acid sequences of SEQ ID NOs: 67 to 70 and all of polypeptides consisting of amino acid sequences of SEQ ID NOs: 5 to 7; and a combination of all of polypeptides consisting of amino acid sequences of SEQ ID NOs: 67 to 70 and all of polypeptides consisting of amino acid sequences of SEQ ID NOs: 5 to 10, and a more preferable example is all of polypeptides consisting of amino acid sequences of SEQ ID NOs: 67 to 70, and 5 to 10.

In yet another embodiment, when target allergens are wheat and buckwheat, allergen-derived polypeptides to be detected preferably comprise any one or more of polypeptides consisting of amino acid sequences of SEQ ID NOs: 1 and 2, any one or more of polypeptides consisting of amino acid sequences of SEQ ID NOs: 67 to 70, and any one or more of polypeptides consisting of amino acid sequences of SEQ ID NOs: 5 to 7, more preferably comprise a polypeptide consisting of an amino acid sequence of SEQ ID NO: 1, any one or more of polypeptides consisting of amino acid sequences of SEQ ID NOs: 67 to 70, and any one or more of polypeptide consisting of amino acid sequences of SEQ ID NOs: 5 to 7, and still more preferably comprise all of polypeptides consisting of amino acid sequences of SEQ ID NOs: 1, 2, 67 to 70, 5, 6 and 7. Allergen-derived polypeptides to be detected can further comprise any one or more of polypeptides consisting of amino acid sequence of SEQ ID NOs: 3 and 4. For example, when target allergens of the method of the present invention are wheat and buckwheat, preferable examples of allergen-derived polypeptides to be detected include combinations of a polypeptide consisting of an amino acid sequence of SEQ ID NO: 1, any one or more of polypeptides consisting of amino acid sequences of SEQ ID NOs: 67 to 70, and any one or more of polypeptides consisting of amino acid sequences of SEQ ID NOs: 5 to 7; combinations of a polypeptide consisting of an amino acid sequence of SEQ ID NO: 1, any one or more of polypeptides consisting of amino acid sequences of SEQ ID Nos: 3 and 4, any one or more of polypeptides consisting of amino acid sequences of SEQ ID NOs: 67 to 70, and any one or more of polypeptides consisting of amino acid sequences of SEQ ID NOs: 5 to 7; combinations of all of polypeptides consisting of amino acid sequences of SEQ ID NOs: 1 and 2, any one or more of a polypeptides consisting of amino acid sequences of SEQ ID NOs: 67 to 70 70, and any one or more of polypeptides consisting of amino acid sequences of SEQ ID NOs: 5 to 7; combinations of all of polypeptides consisting of an amino acid sequence of SEQ ID NOs: 1 and 2, any one or more of polypeptides consisting of amino acid sequences of SEQ ID NOs: 3 and 4, any one or more of polypeptides consisting of amino acid sequences of SEQ ID NOs: 67 to 70, and any one or more of polypeptides consisting of amino acid sequences of SEQ ID NOs: 5 to 7; combinations of a polypeptide consisting of an amino acid sequence of SEQ ID NO: 1, any one or more of polypeptides consisting of amino acid sequences of SEQ ID NOs: 67 to 70, and all of polypeptides consisting of amino acid sequences of SEQ ID NOs: 5 to 7; a combination of a polypeptide consisting of an amino acid sequence of SEQ ID NO: 1, all of polypeptides consisting of amino acid sequences of SEQ ID NOs: 67 to 70, and all of polypeptides consisting of amino acid sequences of SEQ ID NOs: 5 to 7; a combination of all of polypeptides consisting of amino acid sequences of SEQ ID NOs: 1, 2 and 67 to 70, and all of polypeptides consisting of amino acid sequences of SEQ ID NOs: 5 to 7; a combination of all of polypeptides consisting of amino acid sequences of SEQ ID NOs: 1 to 4 and 67 to 70, and all of polypeptides consisting of amino acid sequences of SEQ ID NOs: 5 to 7; a combination of all of polypeptides consisting of amino acid sequences of SEQ ID NOs: 1, 2 and 67 to 70 and all of polypeptides consisting of amino acid sequences of SEQ ID NOs: 5 to 10; and all of polypeptides consisting of amino acid sequences of SEQ ID NOs: 1 to 10 and 67 to 70.

In the method of the present invention, wheat or buckwheat-derived polypeptides other than polypeptides selected from SEQ ID NOs: 1 to 10 and 67 to 70 above can be further detected as target allergen-derived polypeptides. Examples of such other polypeptides include, for wheat, one or more selected from polypeptides specific to wheat proteins disclosed in Patent Literature 1 (disclosed as polypeptides consisting of amino acid sequences of SEQ ID NOs: 11 to 62 in the present specification), and for buckwheat, one or more selected from polypeptides specific to buckwheat proteins disclosed in Patent Literature 3 (disclosed as polypeptides consisting of amino acid sequences of SEQ ID NOs: 63 to 66 in the present specification).

Further, in the method of the present invention, in addition to wheat and buckwheat, other allergens can be further detected as target allergens. Preferred examples of such other allergens include crustaceans such as crabs and shrimps, milk, eggs, and peanuts.

For crustaceans such as crabs and shrimps, degradation products of tropomyosin can be detected as allergen-derived polypeptides. Examples of polypeptides to be detected include one or more selected from polypeptides consisting of amino acid sequences disclosed in Patent Literature 3 as SEQ ID NOs: 8 to 12.

For milk, degradation products of casein or β-lactoglobulin can be detected as allergen-derived polypeptides. Examples of polypeptides to be detected include one or more selected from polypeptides consisting of amino acid sequences disclosed in Patent Literature 1 as SEQ ID NOs: 12 to 29, and one or more selected from polypeptides consisting of amino acid sequences disclosed in Patent Literature 3 as SEQ ID NOs: 13 to 17.

For eggs, degradation products of ovalbumin can be detected as allergen-derived polypeptides. Examples of polypeptides to be detected include one or more selected from polypeptides consisting of amino acid sequences disclosed in Patent Literature 1 as SEQ ID NOs: 1 to 7, and one or more selected from polypeptides consisting of amino acid sequences disclosed in Patent Literature 3 as SEQ ID NOs: 18 to 21.

For peanuts, degradation products of Ara h1-3 can be detected as allergen-derived polypeptides. Examples of polypeptides to be detected include one or more selected from polypeptides consisting of amino acid sequences disclosed in Patent Literature 1 as SEQ ID NOs: 182 to 187, and one or more selected from polypeptides consisting of amino acid sequences disclosed in Patent Literature 3 as SEQ ID NOs: 22 to 24.

As a means for detecting presence or absence of target allergen-derived polypeptides in a sample treated with the above-mentioned protease, an analysis that utilizes chromatographic separation is preferable. Examples of the analysis that utilizes chromatographic separation include liquid chromatography mass spectrometry, such as liquid chromatography tandem mass spectrometry (LC-MS/MS) and liquid chromatography time-of-flight mass spectrometry (LC-TOF/MS). Multiple reaction monitoring (MRM) in which LC-MS/MS is used is preferable because the measurement accuracy (S/N ratio) is high and multiple peptides can be detected at one time.

In the method of the present invention, liquid chromatography (LC) is preferable, and reverse phase liquid chromatography (RPLC) is more preferable as the chromatography used for detecting target allergen-derived polypeptides. The LC is preferably high performance liquid chromatography (HPLC), and more preferably RP-HPLC. Examples of the carrier for RPLC include carriers having a filler in which a hydrocarbon chain (preferably an octadecyl group) is bonded to silica gel or a polymer gel base material, such as C18 columns and C8 columns. The mobile phase (eluent) of the LC can be any one capable of individually separating each target allergen-derived polypeptide, and examples thereof include, but are not limited to, 100:0 to 0:100

(volume ratio) gradient solutions of an aqueous formic acid solution (A) and a formic acid/aqueous acetonitrile solution (B).

In liquid chromatography mass spectrometry, the effluent of the LC is subjected to mass spectrometry (for example, MS/MS and TOF/MS). Mass spectrometry can be performed using a known mass spectrometer such as a tandem quadrupole mass spectrometer and a time-of-flight mass spectrometer under usual conditions used for peptide detection. For example, multiple reaction monitoring (MRM) in which electrospray ionization (ESI) or atmospheric pressure chemical ionization (APCI) is used is preferable. In mass spectrometry, each polypeptide in an effluent is separated according to mass number/charge (m/z). For example, by creating a database of an m/z value of the target polypeptide in advance, the presence or absence of the target polypeptide in a sample can be detected based on the measured m/z value.

EXAMPLES

Hereinafter, the present invention will be described in more detail with reference to Examples. However, the present invention is not limited to the following Examples.
(Reagent)
  Trypsin (Sigma-Aldrich, for molecular biology research)
  Chymotrypsin (MP Biomedicals, derived from porcine pancreas, for biochemical analysis)
  Iodoacetamide (IA) (Sigma-Aldrich, for molecular biology research)
  Dithiothreitol (DTT) (Sigma-Aldrich, for molecular biology research)
  Sodium hydrogen carbonate (JUNSEIKAGAKU, special grade)
  Tris(hydroxymethyl)aminomethane(tris) (FUJIFILM Wako Pure Chemical Corporation, special grade)
  Urea (FUJIFILM Wako Pure Chemical Corporation, special grade)
  Trifluoroacetic acid (TFA) (JUNSEIKAGAKU, special grade)
  Acetonitrile (FUJIFILM Wako Pure Chemical Corporation, for HPLC)
  Methanol (FUJIFILM Wako Pure Chemical Corporation, for HPLC)
  Formic acid (KANTO KAGAKU, for LC/MS)
(LC-MS/MS instrument)
  HPLC: Nexera X2 (SHIMADZU CORPORATION)
  MS/MS: QTRAP 5500(SCIEX)
(HPLC conditions)
  Column: Kinetek C18 (2.1×150 mm, particle size: 2.6 µm; Phenomenex)
  Column temperature: 50° C.
  Column flow rate: 0.3 mL/min
  Injection volume: 2 µL
  Mobile phase: eluent A 0.1 vol % formic acid
    eluent B: 0.1 vol % formic acid/acetonitrile
  Gradient: A: B=99:1 (0 min)→99:1 (4 min)→40:60 (16.5 min)→5:95 (20 min)→5:95 (25 min)→99:1 (25.1 min)→99:1 (35 min)
(Mass spectrometry conditions)
  Measurement mode: sMRM
  Ionization method: Electrospray ionization method
  Polarity: Positive
  Spray voltage: 4.5 kV
  Turbo gas temperature: 500° C.
  Curtain gas: 20 psi
  Nebulizer gas: 50 psi
  Turbo gas: 80 psi
  Collision gas: nitrogen
(Preparation of Test Solution)

To 0.5 g of a sample, 5 mL of 100 mmol/L Tris buffer (pH 8.2) containing 4 mol/L urea and 0.1 mol/L DTT was added, and the mixture was heated at 37° C. for 3 hours. The heated solution was centrifuged (1,500×g, 5 minutes), 50 µL of 40 mg/mL IA solution was added to 0.5 mL of the obtained supernatant, and the mixture was reacted at 37° C. for 30 minutes to alkylate the protein. The reaction liquid was digested overnight by adding 0.1 mL of 10 mg/mL trypsin and 0.5 mL of 50 mmol/L sodium hydrogen carbonate solution. TFA (0.02 mL) was added to the solution after digestion, the mixture was centrifuged (6,000×g, 5 minutes), and the supernatant was collected. An Oasis HLB minicolumn (Waters) was conditioned with 2 mL of methanol and 5 mL of water in advance. The column was loaded with the supernatant, washed twice with 4 mL of 0.5% TFA, and then elution was performed with 6 mL of 70% acetonitrile solution. The eluate was concentrated with an evaporator and dissolved in 0.5 mL of a 5% acetonitrile solution to obtain a test solution.
(LC-MS/MS Analysis)

The obtained test solution was filtered through a 0.22 µm filter and then subjected to LC-MS/MS analysis.

Example 1 Development of Wheat and Buckwheat Allergen Detection Method by LC-MS/MS Analysis 1) Optimization of MRM Transition Conditions For wheat, HMW glutenin (UniProt No: P10387 and P10388) and LMW glutenin (UniProt No: P10385 and P10386) were used as target proteins to be detected. For buckwheat, 13S globulin (UniProt No: O23878) and 11S globulin (UniProt No: A9NJG2) were used as target proteins to be detected. The measurement conditions of LC-MS/MS were optimized using the proteome analysis software "Skyline" developed at the University of Washington. Specifically, for peptides obtained by trypsin digestion of the target proteins, the transition condition of multiple reaction monitoring (MRM) was determined, and the protein that can be constructed from peptides detected by the MRM was examined to extract candidates for the optimum transition condition capable of detecting the target proteins. Table 1 shows the candidate transition condition found for each target protein.

TABLE 1

| Sample | Protein | Peptide | Precusor m/z | Product m/z | Retention time (min) |
|---|---|---|---|---|---|
| Wheat | LMW Glutenin | QIPEQSR | 429.3 | 308.5, 616.2 | 7.6 |
|  | HMW Glutenin | SVAVSQVAR | 458.9 | 659.0, 730.3 | 8.5 |
|  | HMW Glutenin | ELQELQER | 522.8 | 802.4 | 8.7 |
|  | HMW Glutenin | GGSFYPGETTPPQQLQQR | 996.4 | 740.4 | 9.6 |

TABLE 1-continued

| Sample | Protein | Peptide | Precusor m/z | Product m/z | Retention time (min) |
|---|---|---|---|---|---|
| buckwheat | 13S Globulin | GFIVQAR | 395.8 | 177.0, 374.0, 586.2 | 9.4 |
| | 11S Globulin/ 13S Globulin | NAIIGPR/NAILGPR | 370.7 | 299.2, 329.1 | 8.8 |
| | 13S Globulin | ADVFNPR | 409.7 | 533.2 | 8.9 |
| | 13S Globulin | SVFDDNVQR | 540.32 | 893.3 | 9.0 |
| | 13S Globulin | VQWGDEGR | 479.8 | 533.2 | 8.2 |

2) Creation of Calibration Curve

Calibration curves were prepared using the standard solutions of the wheat and buckwheat peptides shown in Table 1, and their linearity and quantification limit concentration were evaluated. Calibration curves were prepared in the range of 1, 2, 5, 10, 20, 50 and 100 ppb (10 to 500 ppb for only SEQ ID NO: 2). As a result, as shown in Tables 2 and 3, good linearity with a coefficient of determination $R^2$ of 0.990 or more was observed in all calibration curves. When the quantification limit concentration was estimated using the S/N ratio of the peak obtained from the calibration solution at the lowest point of each calibration curve as an index, quantification of 1 ppb was judged to be possible except the peptide GGSFYPGETTPPQQLQQR (SEQ ID NO: 2) (quantification limit concentration: 10 ppb) derived from HMW glutenin. From the above, it was shown that the peptides shown in Table 1 enable the detection of trace amounts of wheat- or buckwheat-derived target proteins. Further, the peptides of SEQ ID NOs: 1 and 2 were revealed to be novel wheat allergen markers that have not been used for the detection of wheat allergens so far. In addition, the peptides of SEQ ID NOs: 5, 6 and 7 were revealed to be novel buckwheat allergen markers that have not been used for the detection of buckwheat allergens so far.

TABLE 2

Wheat

| Derivation protein | Peptide | Q1 | Q3 | Quantification limit (µg/kg) | S/N ratio | Linearity ($r^2$) |
|---|---|---|---|---|---|---|
| LMW Glutenin | QIPEQSR (SEQ ID NO: 1) | 429.26 | 308.50 616.20 | 1 1 | 98.8 68.3 | 0.9997 0.9998 |
| HMW Glutenin | GGSFYPGETTPPQQLQQR (SEQ ID NO: 2) | 996.35 | 740.40 | 10* | 126.3 | 0.9990 |
| HMW Glutenin | SVAVSQVAR (SEQ ID NO: 3) | 458.86 | 659.00 730.30 | 1 1 | 16.2 194.3 | 0.9976 0.9987 |
| HMW Glutenin | ELQELQER (SEQ ID NO: 4) | 522.81 | 802.41 | 1 | 11.3 | 0.9996 |

*Due to poor sensitivity, the calibration curve range was set to 10 to 500 µg/kg.

TABLE 3

Buckwheat

| Derivation protein | Peptide | Q1 | Q3 | Quantification limit (µg/kg) | S/N ratio | Linearity ($r^2$) |
|---|---|---|---|---|---|---|
| 11S Globulin/ 13S Globulin | NAIIGPR/NAILGPR (SEQ ID NOs: 5, 6) | 370.66 | 299.20 329.10 | 1 1 | 47.9 28.5 | 0.9998 0.9998 |
| 13S Globulin | ADVFNPR (SEQ ID NO: 7) | 409.71 | 533.20 | 1 | 168.8 | 0.9998 |
| 13S Globulin | GFIVQAR (SEQ ID NO: 8) | 395.77 | 177.00 374.00 586.20 | 1 1 1 | 89.5 59.8 94.2 | 0.9991 0.9997 0.9998 |
| 13S Globulin | SVFDDNVQR (SEQ ID NO: 9) | 540.32 | 893.30 | 1 | 48.9 | 0.9973 |
| 13S Globulin | VQVVGDEGR (SEQ ID NO: 10) | 479.79 | 533.20 | 1 | 32.0 | 0.9989 |

Example 2 Evaluation of Detection Specificity

Eight types of wheat ((1) 1CW, (2) HRW, (3) WW, (4) ASW, (5) French wheat (FBW), (6) Haruyo Koi, (7) Kitahonami (HKH), (8) Shirogane), 5 types of buckwheat ((1) Kitawase, (2) Chinese native breed, (3) Jikuri, (4) Mankan, (5) Hokkai No. 3), and 7 types of cereals (rice, *Echinochloa*, millet, rye, barley, oat, *coix* barley) were used as samples. Using the method developed in Example 1, the presence or absence of wheat- or buckwheat-derived peptides of SEQ ID NOs: 1 to 10 in samples was examined. The results are shown in Tables 4 to 5. FIG. 1 shows an example of chromatograms for wheat samples. The peaks of the peptide of SEQ ID NO: 1 are shown in FIG. 1.

TABLE 4

| Sample (Wheat) | QIPEQSR (SEQ ID NO: 1) | GGSFYPGETTPPQQLQQR (SEQ ID NO: 2) | SVAVSQVAR (SEQ ID NO: 3) | ELQELQER (SEQ ID NO: 4) |
|---|---|---|---|---|
| 1CW | + | + | + | + |
| HRW | + | + | + | + |
| WW | + | + | + | + |
| ASW | + | + | + | + |
| FBW | + | + | + | + |
| Haruyo Koi | + | + | + | + |
| HKH | + | + | + | + |
| Shirogane | + | + | + | + |

| Sample (Buckwheat) | NAIIGPR/ NAILGPR (SEQ ID NOs: 5, 6) | ADVFNPR (SEQ ID NO: 7) | GFIVQAR (SEQ ID NO: 8) | SVFDDNVQR (SEQ ID NO: 9) | VQVVGDEGR (SEQ ID NO: 10) |
|---|---|---|---|---|---|
| Kitawase | + | + | + | + | + |
| Chinese native breed | + | + | + | + | + |
| Jikuri | + | + | + | + | + |
| Mankan | + | + | + | + | + |
| Hokkai No. 3 | + | + | + | + | + |

+: Peak detection

TABLE 5

| Sample (Cereals) | QIPEQSR (SEQ ID NO: 1) | GGSFYPGETTPP QQLQQR (SEQ ID NO: 2) | SVAVSQVAR (SEQ ID NO: 3) | ELQELQER (SEQ ID NO: 4) |
|---|---|---|---|---|
| Brown rice | N.D. | N.D. | N.D. | N.D. |
| Uruchi barnyard millet | N.D. | N.D. | N.D. | N.D. |
| Foxtail millet | N.D. | N.D. | N.D. | N.D. |
| Rye | N.D. | N.D. | N.D. | N.D. |
| Barley | N.D. | N.D. | N.D. | N.D. |
| Oat | N.D. | N.D. | N.D. | N.D. |
| Coix barley | N.D. | N.D. | N.D. | N.D. |
| Buckwheat (Kitawase) | N.D. | N.D. | N.D. | N.D. |
| Buckwheat (Jikuri) | N.D. | N.D. | N.D. | N.D. |

TABLE 5-continued

| Sample (Cereals) | NAIIGPR/ NAILGPR (SEQ ID NOs: 5, 6) | ADVFNPR (SEQ ID NO: 7) | GFIVQAR (SEQ ID NO: 8) | SVFDDNVQR (SEQ ID NO: 9) | VQVVGDEGR (SEQ ID NO: 10) |
|---|---|---|---|---|---|
| Brown rice | N.D. | N.D. | N.D. | N.D. | N.D. |
| Uruchi barnyard millet | N.D. | N.D. | N.D. | N.D. | N.D. |
| Foxtail millet | N.D. | N.D. | N.D. | N.D. | N.D. |
| Rye | N.D. | N.D. | N.D. | N.D. | N.D. |
| Barley | N.D. | N.D. | N.D. | N.D. | N.D. |
| Oat | N.D. | N.D. | N.D. | N.D. | N.D. |
| Coix barley | N.D. | N.D. | N.D. | N.D. | N.D. |
| Wheat (ASW) | N.D. | N.D. | N.D. | N.D. | N.D. |
| Wheat (Haruyo Koi) | N.D. | N.D. | N.D. | N.D. | N.D. |

* N.D. indicates that no peak was observed.

Example 3 Application to Commercial Foods

The applicability of the method developed in Example 1 to commercial foods was verified. Twelve types of commercial foods (product numbers A to L) were used as samples. The types of foods used as samples and the allergens labeled to be contained in the foods are shown in Table 6, and the detection results of the wheat or buckwheat-derived peptides of SEQ ID NOs: 1 to 10 from the food samples are shown in Table 7.

TABLE 6

| Product number | General name | Allergen contained (labeling) |
|---|---|---|
| A | Snacks made from rice | No |
| B | Meat sauce | No |
| C | Furikake | No |
| D | Instant curry | No |
| E | Mixed and thick sauce for okonomiyaki, takoyaki and the like | No |
| F | Dehydrated soup | No |
| G | Curry block | Wheat |
| H | Biscuit | Wheat |
| I | Dried udon | Wheat |
| J | Powder for buckwheat galette | Buckwheat (labeling of wheat contamination) |
| K | Baked confectionery | Buckwheat, wheat |
| L | Japanese confectionery | Buckwheat, wheat |

TABLE 7

| Plant | Protein | Peptides | MRM tranditions Q1 | Q3 | A | B | C | D | E | F | G | H | I | J | K | L |
|---|---|---|---|---|---|---|---|---|---|---|---|---|---|---|---|---|
| Wheat | LMW Glutenin | QIPEQSR | 429.3 | 308.5 | n.d. | n.d. | n.d. | n.d. | n.d. | n.d. | + | + | + | n.d. | + | + |
|  |  |  |  | 616.2 | n.d. | n.d. | n.d. | n.d. | n.d. | n.d. | + | + | + | n.d. | + | + |
|  | HMW Glutenin | SVAVSQVAR | 458.9 | 659.0 | n.d. | n.d. | n.d. | n.d. | n.d. | n.d. | + | + | + | + | + | + |
|  |  |  |  | 730.3 | n.d. | n.d. | n.d. | n.d. | n.d. | n.d. | + | + | + | n.d. | + | + |
|  |  | ELQELQER | 522.8 | 802.4 | n.d. | n.d. | n.d. | n.d. | n.d. | n.d. | + | + | + | n.d. | + | + |
|  |  | GGSFYPGET TPPQQLQQR | 996.4 | 740.4 | n.d. | n.d. | n.d. | n.d. | n.d. | n.d. | + | + | + | n.d. | + | + |
| Buckwheat | 13S Globulin | GFIVQAR | 395.8 | 177.0 | n.d. | n.d. | n.d. | n.d. | n.d. | n.d. | n.t. | n.t. | n.d. | + | + | + |
|  |  |  |  | 374.0 | n.d. | n.d. | n.d. | n.d. | n.d. | n.d. | n.t. | n.t. | n.d. | + | + | + |
|  |  |  |  | 586.2 | n.d. | n.d. | n.d. | n.d. | n.d. | n.d. | n.t. | n.t. | n.d. | + | + | + |
|  | 11S Globulin/ 13S Globulin | NAIIGPR/ NAILGPR | 370.7 | 299.2 | n.d. | n.d. | n.d. | n.d. | n.d. | n.d. | n.t. | n.t. | n.d. | + | + | + |
|  |  |  |  | 329.1 | n.d. | n.d. | n.d. | n.d. | n.d. | n.d. | n.t. | n.t. | n.d. | + | + | + |
|  | 13S Globulin | ADVFNPR | 409.7 | 533.2 | n.d. | n.d. | n.d. | n.d. | n.d. | n.d. | n.t. | n.t. | n.d. | + | + | + |
|  |  | SVFDDNVQR | 540.3 | 893.3 | n.d. | n.d. | n.d. | n.d. | n.d. | n.d. | n.t. | n.t. | n.d. | + | + | + |
|  |  | VQVVGDEGR | 479.8 | 533.2 | n.d. | n.d. | n.d. | n.d. | n.d. | n.d. | n.t. | n.t. | n.d. | + | + | + | n.d.: not detected,
n.t.: not tested,
+: detected

As shown in Table 7, the wheat-derived peptides of SEQ ID NOs: 1 to 4 were not detected in products A to F not labeled as containing wheat, while the wheat-derived peptides were detected in foods G to I, K, and L that contain wheat. The buckwheat-derived peptides of SEQ ID NOs: 5 to 10 were detected only in foods J to L labeled as containing buckwheat. Product J is a food containing buckwheat, and wheat may be mixed therein. In this example, peaks of all buckwheat-derived peptides examined were detected in product J, and a peak was also detected in one transition for wheat-derived peptides. This suggests that a very small amount of wheat protein in mixed in product J, as indicated on the labeling of the product. The above results show that the presence of wheat and buckwheat allergens contained in foods can be detected with high accuracy and high sensitivity by detecting wheat or buckwheat-derived peptides of SEQ ID NOs: 1 to 10 by LC-MS/MS.

Example 4 Development of Wheat Allergen Detection Method by LC-MS/MS Analysis-2

γ-Gliadin (UniProt No. P21292) and LMW glutenin (UniProt No. P10385 and No. P10386) were used as target proteins to be detected. For peptides obtained by subjecting target proteins to chymotrypsin digestion, the measurement conditions of LC-MS/MS were optimized by the same procedure as in Example 1. Table 8 shows the candidate transition condition found for each target protein. The peptides of SEQ ID NOs: 67 to 70 shown in Table 8 were shown to allow detection of wheat. Further, the peptides of SEQ ID NOs: 67 to 70 were novel wheat allergen markers that have not been used for the detection of wheat allergens so far.

TABLE 8

| Derivation protein | Peptide | Q1 | Q3 |
|---|---|---|---|
| γ-Gliadin | EGIRSL (SEQ ID NO: 67) | 337.7 | 544.3, 488.3, 375.2, 219.1 |
| LMW Glutenin | ARSQML (SEQ ID NO: 68) | 353.2 | 443.2, 574.3 |
| LMW Glutenin | EAIRAIIY (SEQ ID NO: 69) | 474.8 | 541.3, 654.4, 295.2, 182.1 |
| LMW Glutenin | VQQQIPVVQPSIL (SEQ ID NO: 70) | 724.9 | 597.3, 429.3 |

Example 5 Evaluation of Detection Specificity

Using the same samples as in Example 2, the presence or absence of wheat-derived peptides of SEQ ID NOs: 67 to 70 in samples was examined by the method developed in Example 4. The results are shown in Table 9.

TABLE 9

| | EGIRSL (SEQ ID NO: 67) | ARSQML (SEQ ID NO: 68) | EAIRAIIY (SEQ ID NO: 69) | VQQQIPVVQPSIL (SEQ ID NO: 70) |
|---|---|---|---|---|
| Sample (Wheat) | | | | |
| 1CW | + | + | + | + |
| HRW | + | + | + | + |
| WW | + | + | + | + |
| ASW | + | + | + | + |
| FBW | + | + | + | + |
| Haruyo Koi | + | + | + | + |
| HKH | + | + | + | + |
| Shirogane | + | + | + | + |
| Sample (Cereals) | | | | |
| Brown rice | N.D. | N.D. | N.D. | N.D. |
| Uruchi barnyard millet | N.D. | N.D. | N.D. | N.D. |
| Foxtail millet | N.D. | N.D. | N.D. | N.D. |
| Rye | N.D. | N.D. | N.D. | N.D. |
| Barley | N.D. | N.D. | N.D. | N.D. |
| Oat | N.D. | N.D. | N.D. | N.D. |
| Coix barley | N.D. | N.D. | N.D. | N.D. |

+ Indicates peak detection, and
N.D. indicates that no peak was observed.

Example 6 Application to Commercial Foods

The applicability of the method developed in Example 4 to commercial foods was verified. As samples, 11 types of commercial foods used in Example 3 were used. The detection results of the wheat-derived peptides of SEQ ID NOs: 67 to 70 in the food samples are shown in Table 10.

TABLE 10

| Product number | Wheat allergen labeling | EGIRSL (SEQ ID NO: 67) | ARSQML (SEQ ID NO: 68) | EAIRAIIY (SEQ ID NO: 69) | VQQQIPVVQPSIL (SEQ ID NO: 70) |
|---|---|---|---|---|---|
| A | No | N.D. | N.D. | N.D. | N.D. |
| B | No | N.D. | N.D. | N.D. | N.D. |
| C | No | N.D. | N.D. | N.D. | N.D. |
| D | No | N.D. | N.D. | N.D. | N.D. |
| E | No | N.D. | N.D. | N.D. | N.D. |
| F | No | N.D. | N.D. | N.D. | N.D. |
| G | Yes | + | + | + | + |
| H | Yes | + | + | + | + |
| I | Yes | + | + | + | + |
| K | Yes | + | + | + | + |
| L | Yes | + | + | + | + |

N.D.: not detected,
+: detected

The above results show that the presence of wheat allergens contained in foods can be detected by detecting wheat-derived peptides of SEQ ID NOs: 67 to 70 by LC-MS/MS.

The invention claimed is:

1. A method for detecting presence or absence of allergens from wheat and from buckwheat in a sample, comprising:
   treating a sample that may contain wheat or buckwheat or both with a protease to provide a protease-treated sample; and
   detecting presence or absence of allergen-derived polypeptides in the protease-treated sample by analysis that utilizes chromatographic separation,
   wherein the allergen-derived polypeptides comprise one or more of polypeptides consisting of amino acid sequences of SEQ ID NOs: 1 and 2 and one or more of polypeptides consisting of amino acid sequences of SEQ ID NOs: 5 to 7.

2. The method according to claim 1, wherein the analysis that utilizes chromatographic separation is liquid chromatography-tandem mass spectrometry (LC-MS/MS).

3. The method according to claim 1, wherein the allergen comprises wheat, and the allergen-derived polypeptide comprises one or more selected from the group consisting of polypeptides consisting of amino acid sequences of SEQ ID NOs: 1 and 2.

4. The method according to claim 3, wherein the allergen-derived polypeptide further comprises one or more selected from the group consisting of polypeptides consisting of amino acid sequences of SEQ ID NOs: 3 and 4.

5. The method according to claim 3, wherein the allergen-derived polypeptide further comprises one or more selected from the group consisting of polypeptides consisting of amino acid sequences of SEQ ID NOs: 67 to 70.

6. The method according to claim 1, wherein the allergen comprises buckwheat, and the allergen-derived polypeptide comprises one or more selected from the group consisting of polypeptides consisting of amino acid sequences of SEQ ID NOs: 5 to 7.

7. The method according to claim 6, wherein the allergen-derived polypeptide further comprises one or more selected from the group consisting of polypeptides consisting of amino acid sequences of SEQ ID NOs: 8 to 10.

8. The method according to claim 1, wherein the allergen-derived polypeptide polypeptides further-comprises comprise one or more selected from the group consisting of polypeptides consisting of amino acid sequences of SEQ ID NOs: 3 and 4.

9. The method according to claim 1, wherein the allergen-derived polypeptides further comprise one or more selected from the group consisting of polypeptides consisting of amino acid sequences of SEQ ID NOs: 67 to 70.

10. The method according to claim 1, wherein the allergen-derived polypeptides further comprise one or more selected from the group consisting of polypeptides consisting of amino acid sequences of SEQ ID NOs: 8 to 10.

11. The method according to claim 1, wherein the allergen-derived polypeptides comprise polypeptides consisting of amino acid sequences of SEQ ID NO: 1, 2, 5, 6, and 7.

12. The method of claim 1, wherein the protease is trypsin or chymotrypsin.

* * * * *